Figure 1:
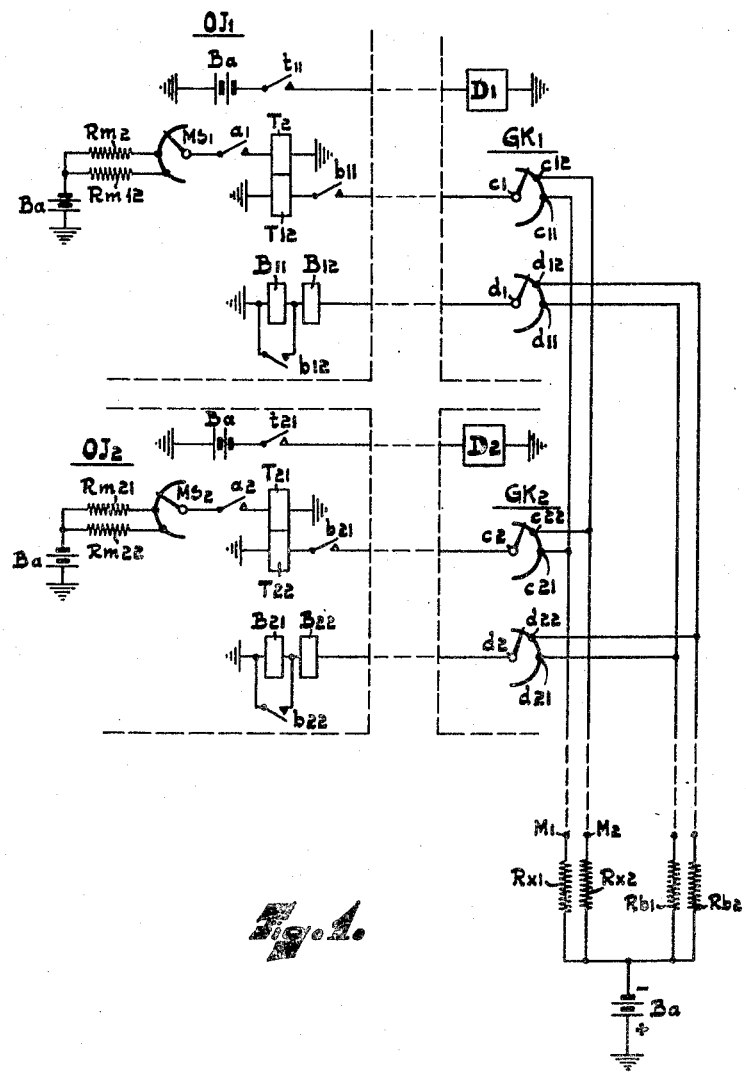

Dec. 21, 1954 R. B. BUCHNER 2,697,752
DEVICE FOR TESTING CHARACTERIZING IMPEDANCES
Filed Oct. 9, 1951 2 Sheets-Sheet 1

INVENTOR
Robert Bertold Buchner
By [signature]
Agent

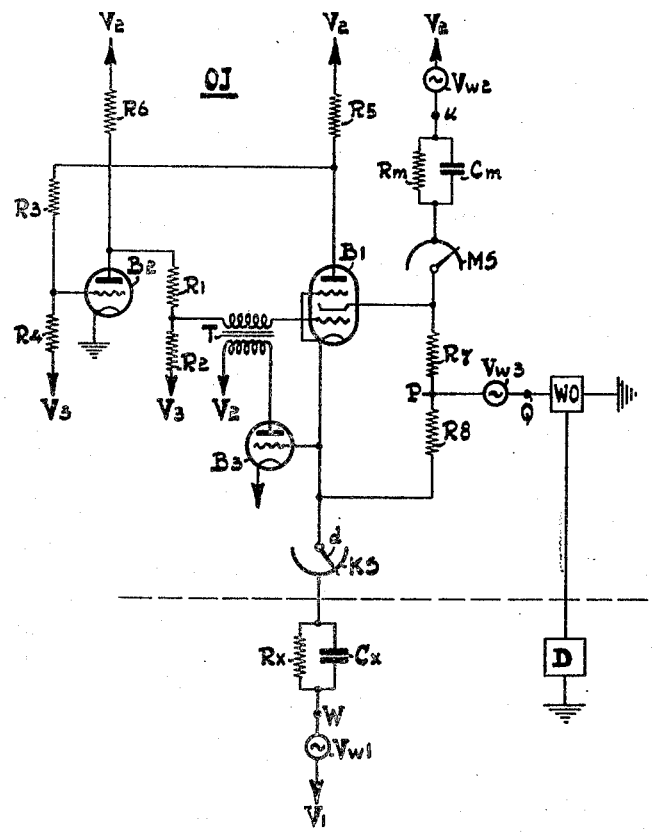

United States Patent Office 2,697,752
Patented Dec. 21, 1954

2,697,752

DEVICE FOR TESTING CHARACTERIZING IMPEDANCES

Robert Bertold Buchner, Hilversum, Netherlands, assignor to Hartford National Bank and Trust Company, Hartford, Conn., as trustee Application October 9, 1951, Serial No. 250,553

Claims priority, application Netherlands October 12, 1950

8 Claims. (Cl. 179—18)

The invention relates to devices for use in an automatic signalling system for carrying out a selective test of a characterizing impedance.

Characterizing impedances are used to represent, by electric means, particular properties or conditions of an apparatus, such for example, as the outlets of selectors, connecting lines and the like. Different properties or conditions are indicated by characterizing impedances having different characteristic values.

Thus, for example, in well-known systems selectors are set with the use of characterizing impedances which are connected to marking contacts of the outlets, each of these characteristic impedances having a value which is characteristic of the digit of the associated outlet. During its movement, the control-device of a switch tests the impedances of the successive outlets by way of a testing wiper by, for example, comparing these values in a bridge circuit with a comparison impedance fixed in a register in accordance with the desired digit. Upon finding an outlet whose impedance bears a particular relation to the comparison impedance, if, for example, it is equal to the latter, the switch is arrested.

As an alternative, characterizing impedances may be used to distinguish between various groups of outlets. Thus, for example, the outlets of call finders or of final selectors may be marked by characterizing impedances which give an indication of the condition of the lines connected to the outlet, indicating, for example, that a line forms part of a group of lines of one subscriber, that a telephone booth or a prepayment box is connected to the line, that there is a possibility of establishing a wanted connection by an indirect route in a particular direction of the traffic that a subscriber is not allowed to make trunk calls and so forth. As a rule, such selective markings are tested after the switch has been arrested. In this case a bridge circuit may also be used in which the tested characterizing impedance is compared in succession with various comparison impedances. The criterion may be that the tested impedance should be equal to a particular comparison impedance or that the sum of the characterizing impedance and the comparison impedance should assume a particular value.

In a circuit-arrangement of the kind referred to above, the characterizing impedance is connected to a multiple point which is coupled to the apparatus with which the characterizing impedance is associated and which is accessible to a plurality of different testing devices. Thus, for example, the marking contacts of a selector switch which are connected to a characterizing impedance are multiplied to corresponding outlet contacts of other selector switches. The characterizing impedance is tested with the use of a testing current, for example, a direct current or an alternating current, which passes through the characterizing impedance, the multiple point and the testing device and which is tested in a direct or an indirect manner by the testing device.

The well-known testing devices do not operate in a very reliable manner, due to the fact that, in principle, the same multiple point may be simultaneously connected along different ways to several testing devices. A characterizing impedance may be tested at the same instant through different selector switches by two or more testing devices. Particularly in areas of great traffic intensity as, for example, in the first group selector stages, such a simultaneous test is anything but imaginary.

The current passing through the characterizing impedance is then divided among the testing devices, so that none of the testing devices have the nominal current which corresponds to the tested resistance. Consequently, the devices obtain an incorrect indication and react improperly; for example, they may set a switch to an unwanted outlet.

A circuit-arrangement for testing characterizing resistors has already been suggested, which eliminates these difficulties, since particular measures have been taken to prevent two or more testing devices simultaneously to pass a testing current through the resistor to be tested. This circuit-arrangement comprises an electronic trigger having a discharge tube, a discharge path of which is included in the testing circuit. The trigger has two electrically stable positions. Normally, the trigger takes up a first position in which the discharge tube is cut off and the testing device has a very high input resistance. The trigger remains in this position, if the testing device is connected to a characterizing impedance which is already being tested by another testing device since the other testing device passes such a direct testing current through the resistor that the multiple point is at a potential at which the trigger in the first-mentioned testing device cannot pass over to the other electric position. Consequently, this testing device maintains a high internal resistance and cannot disturb the measurement carried out by the other device. However, if the testing device is connected to a characterizing resistor which is not tested, the multiple point is at such a potential that the trigger passes into the other position, in which the discharge tube is conductive and such a testing current passes through the characterizing resistor that the potential of the multiple point assumes a value at which a testing device which is subsequently connected to the multiple point can no longer respond.

Consequently, in the circuit-arrangement suggested before, the potential of the multiple point indicates whether the characterizing resistor is tested or not tested at that instant and this potential is determined by the testing current itself.

In a device according to the present invention use is also made of a marking voltage which gives such an indication. However, in contradistinction to the former device, this marking voltage is determined by a current differing from the testing current.

In the device according to the invention for testing a characterizing impedance, of which the value is characteristic of an apparatus associated with the characterizing impedance, the latter is connected to a multiple point added to the apparatus, connected during the test with the testing device and simultaneously accessible for a plurality of testing devices. The test of the characterizing impedance is, in this case, carried out with the use of a testing current passing through the characterizing impedance, the multiple point and the testing device; this current may, in principle, be an alternating current, a direct current, or a mixture thereof.

The device is characterized, furthermore, in that the apparatus is characterized by a marking voltage, the value of which indicates whether the characterizing impedance is tested or not tested and in that the testing device comprises means to test the marking voltage, responding to the presence of a marking voltage corresponding to the condition in which the characterizing impedance is not tested, the testing current being connected across the characterizing impedance, when the said means respond and under the control of these means, the marking voltage being altered into a value corresponding with the condition in which the characterizing impedance is tested by causing a current differing from the testing current to pass through an impedance added to the apparatus.

In this device the marking voltage need not be applied to the multiple point to which the characterizing impedance is connected. This has the advantage that, as in the device previously suggested, the marking voltage need not be tested with idle current and that for this purpose in principle, a relay may, as an alternative, be used. As an alternative, the testing may be carried out by means of an alternating current and the testing or non-testing of the characterizing impedance may be indicated by means of a direct voltage applied to the multiple point connected to the characterized impedance. In this case the direct voltage may be utilized for further purposes, for example, for the indication of a further numerical criterion in the form of a direct voltage having a characteristic value, or at the same time, to indicate the engagement or non-engagement of an outlet.

In order that the invention may be more clearly understood and readily carried into effect, it will now be described more fully with reference to the accompanying drawing, in which a few embodiments are shown diagrammatically and in simplified form.

Fig. 1 shows a circuit-arrangement for the setting of a group-selector by a resistor marking method, having direct current as a test current; and Fig. 2 shows a circuit-arrangement for testing the impedance marking of a switch in which the test of the marking voltage is carried out electronically, the test of the characterizing impedance being effected by means of an alternating current.

Fig. 1 shows two testing devices $OI_1$ and $OI_2$, which govern the numerical setting of group selectors $GK_1$ and $GK_2$, if necessary by way of preceding selector stages. The figure only shows those elements which are required for a good understanding of the invention. The numerical marking contacts $c_{11}$ and $c_{12}$ and so on of $GK_1$ wiped up by the test wiper $c_1$ are connected through characterizing resistors $R_{x1}$ and $R_{x2}$ to a negative terminal of a battery $Ba$, of which the positive terminal is grounded, and are furthermore connected in known manner to corresponding marking contacts $c_{21}$, $c_{22}$ and so on of $GK_2$, which are wiped by the test wiper $c_2$ and of other selectors (not shown) of the selection stage. The values of the characterizing resistors $R_{x1}$, $R_{x2}$ and so on are characteristic of the digit of the associated outlet. Characterizing resistors corresponding to outlets which correspond to different digits are, consequently, different from one another. As a rule, the outlet marking contacts will each be connected to an individual resistor, of which the values are groupwise identical. The marking contacts $d_{11}$, $d_{12}$ and $d_{21}$, $d_{22}$ wiped by the test wipers $d_1$ and $d_2$ respectively of $GK_1$ and $GK_2$ serve to indicate the fact whether an outlet is numerically tested or not tested and at the same time for the normal engagement or of non-engagement marking of the outlets to indicate whether the outlets are busy or free. These marking contacts are connected through resistors $R_{b1}$ and $R_{b2}$ to the battery $Ba$.

The testing device $OI_1$ and $OI_2$ comprise differentiating relays $T_1$ and $T_2$ respectively for testing the numerical marking and testing relays $B_1$ and $B_2$ respectively for testing the busy marking. The relays $T_1$ and $T_2$ are shown in the figure by their two windings $t_{11}$ and $t_{12}$, $t_{21}$ and $t_{22}$ respectively. The relays $B_1$ and $B_2$ are shown by the series-connected windings $b_{11}$ and $b_{12}$, and $b_{21}$ and $b_{22}$ respectively.

During the test the wiper $c_1$ is connected through the working contact $b_{11}$ of the relay $B_1$ and the winding $t_{12}$ to earth and similarly the wiper $c_2$ through working contact $b_{21}$ of relay $B_2$ and winding $t_{22}$. The wipers $d_1$ and $d_2$ are furthermore grounded through the windings $b_{11}$ and $b_{12}$ and $b_{21}$, $b_{22}$ respectively. Between the rotary magnets $D_1$ of $GK_1$ and $D_2$ of $GK_2$ and the battery $Ba$ are located the working contacts $t_{11}$ of $T_1$ and $t_{21}$ of $T_2$. Subsequent to the reception of a digit signal, the marking switches $MS_1$ of $OI_1$ and $MS_2$ of $OI_2$ take up a position which corresponds to the dialed digit, so that the wipers of these switches are connected each to one of the comparison resistors $R_{m11}$, $R_{m12}$, and $R_{m21}$, $R_{m22}$ and so on respectively. The wipers of these marking switches are grounded through contacts $a_1$ and $a_2$ of relays (not shown) and windings $t_{11}$ and $t_{21}$.

The circuit-arrangement operates as follows: After the digit concerned is received by the marking switches and switches of preceding selection stages, if any, have been set to, contact $a_1$ is closed. Thus the relay $T_1$ is energized in a circuit from battery $Ba$ through comparison resistor $R_m$, marking contact and wiper of $MS_1$, contact $a_1$, winding $t_{11}$ to ground. The strength of the current passing through this circuit varies with the value of the resistor $R_m$ included and is, consequently, representative of the dialed digit. The working contact $t_{11}$ of relay $T_1$ completes an energizing circuit for the rotary magnet $D_1$, actuating the selector $GK_1$ and testing through the wiper $d_1$ the marking contacts $d_{11}$, $d_{12}$ and so on. The marking contacts corresponding to outlets already busy or having their numerical resistance tested at that instant have such a potential that the relay $B_1$ cannot be energized. However, if a free outlet is found, the numerical marking resistor of which is not tested, relay $B_1$ is energized in a circuit from earth through the windings $b_{11}$ and $b_{12}$ the wiper $d_1$ and the marking contact of $GK_1$ and furthermore through the resistor $R_{b1}$ or $R_xR_{b2}$ connected to this marking contact to the battery $Ba$. Relay B short circuits through its working contact $b_{12}$ the high-ohmic winding $b_{11}$, owing to which the current passing through the series-connected resistor and hence the potential of the marking contact concerned vary to such an extent that relay B of a further testing device cannot be energized, if connected to the same marking contact. The closure of the working contact $b_{11}$ of the relay $B_1$ completes a circuit from ground through winding $t_{12}$, working contact $b_{11}$, wiper $c_1$, multiple point M, and resistor $R_x$ to battery $Ba$. The current passing through this circuit varies with the value of the resistor $R_x$, which is tested and is, consequently, representative of the digit supplied to the outlet. If the outlet is not associated with the wanted group, the ratio between the currents passing through the windings $T_{11}$ and $T_{12}$ is such that relay $T_1$ remains energized and the selector moves on. During the transition of the wiper $d_1$ to the next following marking contact the current circuit for relays $B_1$ is interrupted, so that this relay is de-energized. If an outlet is found, which corresponds to the digit desired, the magnetizations of the windings $T_{11}$ and $T_{12}$ compensate one another and relay $T_{11}$ is de-energized. Working contact $t_{11}$ opens the energizing circuit of the rotary magnet $D_1$ and the selector is arrested.

If during the test of a characterizing impedance carried out by $OI_1$, the selector $GK_2$ would take up a position similar to that of $GK_1$, relay $B_2$ cannot be energized, as has already been stated, so that working contact $b_{21}$ cannot be closed and the test of the numerical marking resistor of the outlet concerned carried out by $OI_1$ cannot be affected by $DI_2$. During a call relay $B_1$ remains energized, so that the outlet engaged is continuously marked busy.

In the circuit-arrangement shown in Fig. 2 the test or non-test of a characterizing impedance is examined and the testing current is switched on with the use of electronic means. This has the advantage that the testing device responds more rapidly than in the case of a test carried out with the use of a relay, so that there is more time available for the test proper of the characterizing impedances.

The characterizing impedances connected to the outlet marking contacts wiped by test wipers $d$ of selectors KS are formed by the parallel combination of a resistor $R_x$ and a capacitor $C_x$. On the other hand the characterizing impedances are connected through an alternating current source $V_{w1}$ to a direct current source $V_1$, the voltage of which is, for example, $-60$ v. to earth. The characterizing impedances are tested by means of alternating current, while the marking voltage, which indicates whether the characterizing impedance is tested or whether the outlet is engaged, is constituted by the direct voltage of the same marking contact to which the characterizing impedance concerned is connected.

The testing device OI tests the marking voltage and switches on the testing current by means of a trigger circuit, which comprises discharge tubes $B_1$ and $B_2$. The control-grid of tube $B_1$ is connected through a winding of a transformer T, the purpose of which will be evident hereinafter, to a tapping of a potentiometer $R_1$, $R_2$, connected between the anode of tube $B_2$ and a direct voltage source $V_3$. The tapping is chosen to be such that, if tube $B_2$ is conductive, the control-grid of $B_1$ has a voltage of $-30$ v. to earth, whereas, if tube $B_2$ is cut-off, the voltage of the control-grid is approximately equal to ground potential. The control-grid of tube $B_2$ is coupled in a similar manner through a potentiometer $R_3$, $R_4$ with the anode of tube $B_1$. The anodes of $B_1$ and $B_2$ are furthermore connected through resistors $R_5$ and $R_6$ to a positive voltage source $V_2$.

Tube $B_1$ comprises a screen grid which is connected to a wiper of marking switch MS. The outlet contacts of MS are connected to comparison impedances, which are formed by the parallel combination of a resistor $R_m$ and a capacitor $C_m$ and which correspond each with the various characterizing impedances connected to the marking contacts of the selector switch KS. The comparison impedances $R_m$, $C_m$ are connected on the other hand through an alternating voltage source $V_{w2}$ to a direct voltage source $V_2$. Between the screen grid and the cathode of tube $B_1$ is connected a potentiometer $R_7$, $R_8$. The central tapping of this potentiometer is connected through the alternating voltage source $V_{w3}$ to an alternating voltage measuring device WO. This device may, for example, be formed by an alternating voltage amplifier, the output voltage of which is supplied to a rectifier, whereas the direct output current or voltage of the rectifier controls a relay of a further discharge tube.

The alternating voltage sources $V_{w1}$, $V_{w2}$ and $V_{w3}$ may be formed with advantage by secondary windings of transformers, the primary windings of which are connected to a common alternating voltage generator. The resistance of the potentiometer $R_7$, $R_8$ is so high that the current passing through it is negligibly small with respect to the minimum testing current.

In the circuit-arrangement position of rest the tube $B_1$ is cut off, so that the anode of this tube hence also the grid of tube $B_2$ have a comparatively high potential and tube $B_2$ is conductive. The anode of tube $B_2$ has a comparatively low potential, so that the potential of the control-grid of tube $B_1$ is approximately equal to −30 v.

The direct voltage of marking contacts of free outlets is equal to −60 v., whereas the marking contacts of outlets of which the characterizing impedances are tested or which are busy are approximately at ground potential. If the cathode of tube $B_1$ is connected through the wiper $d$ to the marking contact of a tested or an engaged outlet, the potential of the cathode of tube $B_1$ is so much higher than that of the control-grid that the tube remains cut-off. Then the testing device does not pass a current through the characterizing impedance $R_x$, $C_x$, apart from the very low current passing through resistors $R_7$, $R_8$, so that a test, if any, carried out by another testing device is not disturbed.

The alternating voltage testing device WO is constructed to be such that it can only respond, if the amplitude of the alternating voltage at point Q is at least approximately equal to zero. Then the alternating voltage of the point P is equal to $V_{w3}$. As stated before, the value of the resistors $R_7$, $R_8$ is high relative to the comparison impedances $R_m$, $C_m$. If the wiper $d$ strikes a marking contact of a busy or a free outlet, the alternating voltage amplitude of this wiper is very small, and thus the alternating voltage at point P is approximately equal to $½V_{w2}$. The alternating voltages $V_{w1}$, $V_{w2}$ and $V_{w3}$ are chosen to be such that half the sum of the alternating voltages of ponits U and W is equal to $V_{w3}$. If the voltages $V_{w1}$ and $V_{w2}$ are equal to one another and in phase opposition, the voltage $V_{w3}$ is consequently zero, so that the source $V_{w3}$ may be dispensed with. The measuring device WO can thus only respond, when the voltage at point P is equal to half the sum of the voltages $V_{w1}$ and $V_{w2}$. Consequently the device WO cannot respond, when the wiper $d$ strikes a contact of a busy or a free outlet, since in this case the voltage at point P is equal to $½V_{w2}$. The the switch moves on. It will be obvious that, in principle, it is not necessary that the characterizing impedances and comparison impedances added to one another should be equal to one another, there may, as an alternative, be a fixed ratio between the values differing from 1. In this case the tapping must not be in the center of the potentiometer, but thus that the tapping divides the resistor into the fixed ratio, while furthermore the voltage $V_{w3}$ is to be chosen accordingly.

Upon finding a free, non-tested outlet, the direct voltage of the cathode of tube $B_1$ drops to −60 v. The potential of the control-grid of tube $B_1$ is then 30 v. positive with respect to that of the cathode and tube $B_1$ becomes conductive. Thus the anode voltage of this tube drops and hence also the voltage at the control-grid of tube $B_2$, so that this tube is cut off. Consequently, the voltage of the control-grid of tube $B_1$ increases to approximately ground potential.

Thus, tube $B_1$ abruptly opens completely and the alternating testing current is switched on. This current passes through the circuit of the direct voltage source $V_z$, across the alternating voltage source $V_{w2}$, the comparison impedance $R_m$, $C_m$, marking switch MS, screen grid and cathode of tube $B_1$, wiper $d$ and marking contact of KS, characterizing impedance $R_x$, $C_x$, alternating voltage source $V_{w1}$, to point $V_1$. The values of the resistors $R_5$, $R_3$ and $R_4$ are so high that only a negligible fraction of the alternating current of tube $B_1$ is withdrawn across these resistors and substantially the complete emission current passes through the screen grid. The resistors $R_7$ and $R_8$ are equal to one another. If the characterizing impedance $R_x$, $C_x$ is also equal to the comparison impedance $R_m$, $C_m$, the alternating voltage at point P is equal to half the sum of the alternating voltages at points U and W, so that the device WO will respond, as stated above. With the use of means known per se and not shown in the figure, the device WO arrests the movement of the selector switch KS by demagnetization of the rotary magnet D.

It should be noted that the resistance formed by the discharge path between the cathode and the screen grid of tube $B_1$ is connected in parallel with the potentiometer $R_7$, $R_8$, so that the value of this resistance does not affect the statement of the equality of the characterizing impedance to the comparison impedance, as long as the value of this resistance is small with respect to the sum of the resistors $R_7$ and $R_8$.

Since the tube $B_1$ becomes conductive, a direct current furthermore passes through resistor $R_x$ and the potential of the marking contact increases to approximately ground potential, since the voltage of the cathode of tube $B_1$ follows the voltage of the control-grid. Then the outlet concerned is marked busy or free, so that a further testing device, which controls a switch, the wiper of which then reaching a corresponding marking contact, cannot respond, as stated above. Upon the response of the device WO, the wiper $d$ is grounded in a direct manner by means known per se and not shown in the figure, so that the outlet is continuously marked busy.

If the characterizing impedance is not equal to the comparison impedance, no more is the alternating voltage at point P equal to half the sum of the voltages at points U and W, so that the device WO does not respond. Then the selector moves on. As a matter of course, since the tube $B_1$ becomes conductive, the outlet is marked tested during the test, i. e. as long as the wiper $d$ is in contact with the marking contact concerned. As soon as the wiper $d$ abandons the marking contact, the cathode lead of the tube $B_1$ is interrupted, so that tube $B_1$ is cut off and tube $B_2$ again becomes conductive, after which the testing device has returned to its initial position. The procedure described is repeated, as soon as the wiper $d$ strikes the marking contact of a next following free outlet.

Since the marking contacts of a switch are multipled to contacts of other switches, the wiring capacity associated with the test wiper may assume considerable values, the more so when a characterizing impedance is tested through a number of selector switches connected in cascade. The wiring capacity may seriously disturb the accuracy of the measurement, since part of the testing current is led off to ground across this capacity.

In order to eliminate its influence, the circuit-arrangement shown in Fig. 2 comprises a particular means. Use is made for this purpose of an additional tube $B_3$, the cathode of which is connected to a suitably chosen voltage source, the control-grid being connected to the cathode of tube $B_1$. The anode circuit of tube $B_3$ is coupled through a transformer T with the grid circuit of tube $B_1$ in such a sense that the alternating voltage of the cathode is transmitted in phase opposition and amplified to the control-grid of tube $B_1$. If the voltage at the cathode of tube $B_1$ is $V_k$, the voltage at the control-grid tube $B_1V_g$ and the mutual conductance of tube $B_1S$, it follows as is known, for the negative emission current I, i. e. the current flowing from the wiper $d$ into the direction of the cathode, that $$I = S(V_k - V_g)$$

If the cathode voltage is transmitted with an amplification of a factor $-f$ by tube $B_3$, to the control-grid of tube $B_1$, it follows that $$V_g = fV_k$$

so that the apparent internal resistance of the tube, viewed from the wiper $d$, is equal to:

$$\frac{V_k}{1} = \frac{L}{S(1+f)}$$

In the absence of tube $B_3$, the mutual conductance S being 10 MA/V the internal resistance of the testing device would be 100Ω. With an amplification of 100 by tube $B_3$ the internal resistance of the testing device consequently is only about 1Ω for alternating currents. The alternating voltage amplitude of the cathode of tube $B_1$, and hence also the alternating voltage across the interfering wiring capacity, are thus substantially zero, so that the wiring capacity has substantially no influence on the test of the characterizing impedance.

The circuit-arrangement described may be used with advantage for the setting of a final selector. In this case the outlet contacts have two digits, i. e. the decade and the unit digits of the number of the subscriber called. These two digits may be characterized irrespective of one another by the values of the alternating current impedance of the characterizing impedance and of the direct current resistance of the characterizing impedance. These two impedances may be simultaneously tested by the testing device. The latter must then comprise a device for measuring the direct voltage at point P, this device may be of a known kind. The test of the alternating current impedance is carried out in a completely similar manner to that described above. The direct current passing through the characterizing impedance, when the tube $B_1$ is conductive, now has a double function, i. e. the direct voltage drop across the resistor $R_x$ marks the outlet tested, as in the former case, so that a further testing device cannot respond. Secondly, the direct current serves as a testing current for the resistor $R_x$. If the resistor $R_x$ is equal to resistor $R_m$, which is set by the marking switch MS, the voltage at point P is equal to half the sum of the direct voltages of points U and W. The device measuring the direct current potential of point P must consequently be such that it responds when the voltage at point P is equal to ½ $(V_1+V_2)$.

In this case the testing device must be such that it only responds and interrupts the energizing circuit of the rotary magnet, when both the alternating voltage testing device WO and the direct voltage measuring device respond.

What I claim is:

1. An automatic signalling system provided with testing apparatus for successively testing the values of a plurality of characterizing impedances, each characterizing impedance having a value representing a particular outlet connected thereto and being connected to a respective multiple point, each outlet when free exhibiting a marking voltage which has a value different from that when busy, said testing apparatus being further adapted to select any characterizing impedance connected to a free outlet which has a value bearing a predetermined relation to a comparison impedance, said testing apparatus comprising a selector having actuating means and a switch to successively engage each characteristic impedance through its corresponding multiple point, a testing device connected to said selector to successively test the marking voltage of each outlet as the corresponding characteristic impedance is engaged and to produce a testing current flow dependent upon the value of said engaged characteristic impedance in the condition when the outlet corresponding to said engaged characterizing impedance is free, and means connecting said testing device to said comparison impedance to derive a comparison current dependent on the value thereof, said testing device further including means jointly responsive to said comparison current and said testing current to de-energize said selector actuating means when the testing current and the comparison current represent impedance values bearing said predetermined relation whereby said impedances are selected.

2. An automatic signalling system provided with testing apparatus for successively testing the values of a plurality of characterizing impedances, each characterizing impedance having a value representing a particular outlet connected thereto and being connected to a respective multiple point, each outlet having a marking impedance connected thereto which when the outlet is free exhibits a marking voltage which has a value different from that when busy, said apparatus being further adapted to select any characterizing impedance connected to a free outlet which has a value bearing a predetermined relation to a comparison impedance, said testing apparatus comprising a selector having actuating means and including a first switch provided with a rotatable wiper and contacts which are connected to respective multiple points to successively connect the wiper of the first switch with each characteristic impedance through its corresponding multiple point, said selector also including a second switch provided with a rotatable wiper and contacts which are connected to respective marking impedances to successively test the marking voltage of each outlet by connecting the wiper of the second switch with each marking impedance as the corresponding characteristic impedance is connected to the wiper of the first switch, a testing device connected to said selector and responsive to said marking voltage to produce a testing current flow dependent upon the value of said engaged characteristic impedance in the condition when the outlet corresponding to said engaged characterizing impedance is free, and means connecting said testing device to said comparison impedance to derive a comparison current dependent on the value thereof, said testing device including means jointly responsive to said comparison current and said testing current to de-energize said selector actuating means when the testing current and the comparison current represent impedance values bearing said predetermined relation whereby said impedances are selected.

3. Testing apparatus as set forth in claim 2 wherein the marking voltages are direct voltages and the testing current is an alternating current.

4. An automatic signalling system provided with testing for successively testing the values of a plurality of characterizing impedances, each characterizing impedance having a value representing a particular outlet connected thereto and being connected to a respective multiple point, each outlet having a marking impedance connected thereto which when the outlet is free exhibits a direct marking voltage which has a value different from that when busy, said apparatus being further adapted to select any characterizing impedance connected to a free outlet which has a value bearing a predetermined relation to a comparison impedance, said testing apparatus comprising a selector providing with actuating means and including a first switch provided with a rotatable wiper and contacts which are connected to respective multiple points to successively connect the wiper of the first switch with each characteristic impedance through its corresponding multiple point, said selector further including a second switch provided with a rotatable wiper and contacts which are connected to respective marking impedances to successively test the marking voltage of each outlet by connecting the wiper of the second switch with each marking impedance as the corresponding characteristic impedance is connected to the wiper of the first switch, a testing device including an electronic trigger circuit connected to said selector and responsive to said marking voltage to produce a testing current flow dependent upon the value of said engaged characteristic impedance in the condition when the outlet corresponding to said engaged characterizing impedance is free and then to busy said corresponding free outlet, said trigger circuit being provided with an electron discharge tube interposed between the wiper of the second switch and a point of direct potential having a value at which said tube is rendered conductive in the condition when the marking voltage of said corresponding free outlet is supplied to the wiper of said second switch to produce said testing current flow, means connecting said testing device to said comparison impedance to derive a comparison current dependent on the value thereof, said testing device further including means jointly responsive to said comparison current and said testing current to de-energize said selector actuating means when the testing current and the comparison current represent impedance values bearing said predetermined relation whereby said impedances are selected, said tube being provided with a cathode, a control grid and an anode, said cathode being connected to the wiper of the second switch, said anode being connected to said direct potential point, and an additional electron discharge tube having a control grid and an anode, the anodes and grids of said tubes being cross-connected whereby when one of said tubes is rendered conductive the other of said tubes is rendered non-conductive.

5. Testing apparatus as set forth in claim 4 further including means connected to said second tube to substantially reduce the input impedance of said tube when said additional tube is rendered non-conductive.

6. An automatic signalling system provided with testing apparatus successively testing the values of a plurality of characterizing impedances, each characterizing impedance having a value representing a particular outlet connected thereto and being connected to a respective multiple point, each outlet having a marking impedance connected thereto which when the outlet is free exhibits a direct marking voltage which has a value different from that when busy, to select any characterizing impedance coupled to a free outlet which has a value bearing a predetermined relation to a comparison impedance, said testing apparatus comprising a selector provided with an electromagnetic actuator and including a first switch provided with a rotatable wiper and contacts which are connected to respective multiple points to successively connect the wiper of the first switch with each characteristic impedance through its corresponding multiple point, a like plurality of alternating current sources, each source being connected to a corresponding multiple point through the characteristic impedance connected thereto, said selector further including a second switch provided with a rotatable wiper and contacts which are connected to respective marking impedances to successively test the marking voltage of each outlet by connecting the wiper of the second switch with each marking impedance as the corresponding characteristic impedance is connected to the wiper of the first switch, a testing device including an electronic trigger circuit connected to said selector to produce an alternating testing current flow therein dependent upon the value of said engaged characteristic impedance in the condition when the outlet corresponding to said engaged characterizing impedance is free and then to busy said corresponding free outlet, said trigger circuit being provided with an electron discharge tube interposed between the wiper of the second switch and a point of direct potential having a value at which said tube is rendered conductive in the condition when the marking voltage of said corresponding free outlet is supplied to the wiper of said second switch to produce said alternating test current flow, means connecting said testing device to said comparison impedance to derive a comparison current dependent on the value thereof, said testing device further including means jointly responsive to said comparison current and said testing current to de-energizing said selector actuator when the testing current and the comparison current represent impedance values bearing said predetermined relation whereby said impedances are selected, an additional alternating-current source, a potentiometer shunting the discharge path of said tube and connected to said additional source, said potentiometer having a value which is high with respect to the value of any of said impedances and being provided with a tap, and means to test the alternating voltage yielded by said tap.

7. Testing apparatus as set forth in claim 6 further including means to test the direct voltage yielded by the tap of said potentiometer.

8. Testing apparatus as set forth in claim 7 wherein said additional source is in series with said potentiometer.

References Cited in the file of this patent

UNITED STATES PATENTS

| Number | Name | Date |
|---|---|---|
| 2,237,413 | Clark | Apr. 8, 1941 |
| 2,376,346 | Deakin | Mar. 22, 1945 |
| 2,419,540 | Deakin | Apr. 29, 1947 |